(12) United States Patent
Hall

(10) Patent No.: US 11,635,261 B2
(45) Date of Patent: Apr. 25, 2023

(54) COOLING ARRANGEMENT FOR COOLING OF AN ELECTRIC MACHINE AND AT LEAST ONE FURTHER COMPONENT OF AN ELECTRIC POWER UNIT AND A VEHICLE COMPRISING SUCH A COOLING ARRANGEMENT

(71) Applicant: Scania CV AB, Södertälje (SE)

(72) Inventor: Ola Hall, Stockholm (SE)

(73) Assignee: Scania CV AB, Södertälje (SE)

( * ) Notice: Subject to any disclaimer, the term of this patent is extended or adjusted under 35 U.S.C. 154(b) by 230 days.

(21) Appl. No.: 16/607,119

(22) PCT Filed: May 3, 2018

(86) PCT No.: PCT/SE2018/050457
§ 371 (c)(1),
(2) Date: Oct. 22, 2019

(87) PCT Pub. No.: WO2018/208208
PCT Pub. Date: Nov. 15, 2018

(65) Prior Publication Data
US 2020/0300550 A1    Sep. 24, 2020

(30) Foreign Application Priority Data

May 10, 2017  (SE) .................... 1750574-4

(51) Int. Cl.
*F28F 9/00* (2006.01)
*F28D 9/00* (2006.01)
*F28D 15/06* (2006.01)

(52) U.S. Cl.
CPC ......... *F28D 9/0006* (2013.01); *F28D 9/0093* (2013.01); *F28D 15/06* (2013.01)

(58) Field of Classification Search
CPC ........ F28D 15/06; F28D 9/006; F28D 9/0093; F28D 9/0006; F28D 9/00; B60H 1/08;
(Continued)

(56) References Cited

U.S. PATENT DOCUMENTS 6,323,613 B1   11/2001   Hara et al. ............... 318/471
8,375,917 B1   2/2013    Neal et al. ............. 123/196 AB
(Continued)

FOREIGN PATENT DOCUMENTS

CN   101809262 A    8/2010
CN   103362629 A    10/2013
(Continued)

OTHER PUBLICATIONS

European Search Report, dated Jan. 12, 2021, issued in corresponding European Patent Application No. 18 797 584.2. Total 7 pages.
(Continued)

*Primary Examiner* — Harry E Arant
(74) *Attorney, Agent, or Firm* — Banner & Witcoff, Ltd.

(57) ABSTRACT

A cooling arrangement for an electric machine (2) and at least one further component (4, 5) of an electric power unit: The cooling arrangement comprises an oil circuit (16), an oil pump (46) circulating oil to the electric machine (2), a first coolant circuit (6) configured to cool the further component (5) of the electric power unit, and coolant radiator arrangement (8a, 8b) in which the coolant in the first coolant circuit (6) is cooled by air, The oil circuit (16) comprises an oil radiator (46), an oil radiator fan (47) configured to provide an adjustable air flow through the oil radiator (46) and a heat exchanger (15) in which heat is transferred between the coolant in the first coolant circuit (6) and the oil in the oil circuit (16).

19 Claims, 1 Drawing Sheet

(58) Field of Classification Search
CPC ............ B60H 1/32284; B60H 1/00278; B60H 2001/00307; B60H 1/323; B60K 11/02; B60K 2001/003; B60K 2001/005; B60K 2001/006

See application file for complete search history.

(56) References Cited

U.S. PATENT DOCUMENTS

| | | | |
|---|---|---|---|
| 2002/0112679 A1 | 8/2002 | Langervik | 123/41.33 |
| 2004/0035130 A1* | 2/2004 | Amaral | B60H 1/32284 62/323.1 |
| 2008/0264359 A1 | 10/2008 | Marsh et al. | 123/41.33 |
| 2009/0107424 A1 | 4/2009 | Blassnitz et al. | 123/41.12 |
| 2012/0104843 A1 | 5/2012 | Füchtner | 307/9.1 |
| 2012/0168140 A1 | 7/2012 | Yokkoyama et al. | 165/271 |
| 2013/0323095 A1* | 12/2013 | Tazume | F04B 49/065 417/364 |
| 2015/0114323 A1* | 4/2015 | Paetkau | F01P 3/20 123/2 |
| 2016/0339898 A1* | 11/2016 | Kamado | F01P 5/04 |
| 2017/0274895 A1* | 9/2017 | Ohashi | F16H 57/0441 |
| 2019/0241060 A1* | 8/2019 | Hara | E02F 9/0866 |

FOREIGN PATENT DOCUMENTS

| | | | | |
|---|---|---|---|---|
| CN | 103465770 A | * | 12/2013 | |
| CN | 103465770 B | | 12/2015 | |
| CN | 106558741 A | | 4/2017 | |
| DE | 10 2008 015 897 A1 | | 10/2009 | |
| DE | 10 2012 205 141 A1 | | 10/2013 | |
| DE | 10 2014 115377 A1 | | 4/2015 | |
| DE | 102014115377 A1 | * | 4/2015 | ............. B60K 11/04 |

OTHER PUBLICATIONS

Novelty Search Report dated Jan. 5, 2017.
Office Action dated May 7, 2018 in corresponding Swedish Patent Application No. 1750574-4.
International Search Report dated Jun. 12, 2018 in corresponding PCT International Application No. PCT/SE2018/050457.
Written Opinion dated Jun. 12, 2018 in corresponding PCT International Application No. PCT/SE2018/050457.
Mar. 29, 2022—(CN) Office Action of CN Application No. 2018800294783.
Sep. 13, 2022—(BR) Preliminary Office Action—App. No. BR 11 2019 022915 9.

* cited by examiner ion No. 1750574-4, filed May 10, 2017, the contents of which are incorporated by reference herein. The PCT International Application was published in the English language.

COOLING ARRANGEMENT FOR COOLING OF AN ELECTRIC MACHINE AND AT LEAST ONE FURTHER COMPONENT OF AN ELECTRIC POWER UNIT AND A VEHICLE COMPRISING SUCH A COOLING ARRANGEMENT

CROSS-REFERENCE TO RELATED APPLICATIONS

The present application is a 35 U.S.C. §§ 371 national phase conversion of PCT/SE2018/050457, filed May 3, 2018, the contents of which are incorporated herein by reference which claims priority of Swedish Patent Application No. 1750574-4, filed May 10, 2017, the contents of which are incorporated by reference herein. The PCT International Application was published in the English language.

BACKGROUND OF THE INVENTION AND PRIOR ART

The present invention relates to a cooling arrangement for cooling of an electric machine and at least one further component an electric power unit according to the preamble of claim 1. The invention also relates to a vehicle comprising such a cooling arrangement.

Hybrid vehicles may be powered by an electric power unit in combination with some other form of power unit such as a combustion engine. The electric power unit may comprise components such as an electric machine which alternately works as motor and generator, an electric energy storage storing electric energy and power electronics controlling the flow electric energy between the electric energy storage and the electric machine. The power electronics may include a DC converter and an inverter for conducting electric energy between the electric energy storage and the electric machine. The electric machine, electric energy storage and the power electronics are heated during operation and need to be cooled.

The electric energy storage are designed to operate within a specific temperature range. The electric energy storage may have an optimal efficient operating temperature within the temperature range of 20-40° C. The power electronics can usually withstand a temperature up to about 60-70° C. Consequently, it is suitable to cool the electric energy storage and the power electronics with coolant of different temperatures. Furthermore, the efficiency of the electric energy storage is reduced when it has a too low temperature. Consequently, it is also suitable to heat the electric energy storage during operating conditions when it has a too low temperature. The electric machine is not allowed to be heated to a higher temperature than a maximum acceptable temperature.

It is known to use a cooling arrangement in a vehicle comprising a first coolant circuit for cooling of power electronics and a second coolant circuit for cooling of the electric energy storage. The coolant in the first coolant circuit is cooled in a coolant radiator. The coolant in the second coolant circuit is cooled in a separate coolant radiator when ambient air has a low temperature and by a refrigeration system when ambient air has a high temperature. The electric machine may be cooled by oil circulating in an oil circuit. The oil may be sprayed on the stator windings of the electric machine.

DE 102008015897 shows an oil flow circuit provided to lubricate and cool a first power unit and a second power unit of a hybrid vehicle. The first power unit comprises an electric motor. The oil is cooled in a first heat exchanger by coolant and in a second heat exchanger by air before oil is directed to the electric motor.

SUMMARY OF THE INVENTION

The object of the present invention is to provide a cooling arrangement providing an efficient cooling of an electric machine and at least one further component of a power electronic unit.

The above mentioned object is achieved by the cooling arrangement incorporated herein. The cooling arrangement comprises an oil circuit with a circulating oil configured to cool an electric machine of the electric power unit and a first coolant circuit configured to cool a further component of the electric power unit. The oil circuit comprises an oil radiator in which the oil is cooled by air and a heat exchanger in which heat is transferred between the coolant in the first coolant circuit and the oil. The existence of the oil radiator and the heat exchanger makes it possible to provide a temperature change of the oil in the oil circuit in two steps to a desired temperature before the oil is directed to the electric machine. Since the first coolant circuit does not need to provide the entire cooling of the oil in the oil circuit, it is possible to equip the first coolant circuit with a relatively small coolant radiator arrangement. The thermal inertia of the first coolant circuit makes it possible to provide a stable cooling of the electric machine when the cooling demand of an electric machine changes rapidly. Furthermore, the existence of the heat exchanger makes it possible to change the temperature of the coolant in the first coolant circuit. During operating conditions when the oil has a lower temperature than the coolant in the first coolant circuit, it is possible to cool the coolant in the first coolant circuit by the oil in the heat exchanger.

According to an embodiment of the invention, the oil radiator may be arranged in a position upstream of the heat exchanger which in turn is arranged in a position upstream of the electric machine in the oil circuit. In this case, the oil is cooled in a first step in the oil cooler and heated or cooled in a second step in the heat exchanger before it is directed to the electric machine. During most operating conditions, the oil is cooled in the oil radiator in a first step and in the heat exchanger in a second step in before it is directed to the electric machine. However, it is also possible to arrange the heat exchanger in a position upstream of the oil radiator and the electric machine in the oil circuit.

According to an embodiment of the invention, the cooling arrangement comprises a control unit configured to control the cooling of the oil in the oil radiator. The control unit may receive information regarding the cooling of the oil in the heat exchanger, whereupon the cooling unit controls the cooling of the oil in the oil radiator such that the oil is cooled to a suitable temperature before it is directed to the electric machine.

According to an embodiment of the invention, the control unit is configured to control the speed of the oil radiator fan. The oil radiator fan may be driven by an electric motor. In this case, it is easy to adjust the speed of the oil radiator fan in order to change the air flow through the oil radiator and thus the cooling effect of the oil in the oil radiator. The control unit may also be configured to control the speed of an oil pump circulating oil through the oil circuit. The oil radiator fan may be driven by an electric motor. In this case, it is easy to adjust the speed of the oil pump and the oil flow circulating through the oil cooler and thus the cooling effect of the oil in the oil radiator.

According to an embodiment of the invention, the control unit is configured to receive information from a temperature sensor about a temperature related to the temperature of the electric machine and that the control unit is configured to control the cooling of the oil in the oil radiator in view of this information. The temperature sensor may sense the temperature of the oil in a downstream position of the electric machine at which the oil has a temperature related to the temperature of the electric machine. Alternatively, the temperature sensor is arranged on a suitable part of the electric machine where it senses the temperature of said part of the electric machine.

According to an embodiment of the invention, the oil radiator is arranged in a position in which the oil is cooled by air of ambient temperature. In this case, it is possible to provide a cooling of the oil in the oil radiator to a temperature close to ambient temperature at a high speed of the oil radiator fan.

According to an embodiment of the invention, the further component of the electric power unit is configured to be cooled in a position upstream of the heat exchanger in the first coolant circuit. In this case, it is possible to cool the further component before the coolant enters the heat exchanger. The further component may be power electronics of the electric power unit which controls the flow of electric energy between the electric machine and an electric energy storage. Alternatively, the further component of the electric power unit is configured to be cooled in a position downstream of the heat exchanger in the first coolant circuit.

According to an embodiment of the invention, the cooling arrangement comprises a coolant radiator fan configured to provide an air flow of a variable speed through the coolant radiator arrangement. The coolant radiator fan may be driven by an electric motor making is possible to adjust the speed of the fan and the air flow through the coolant radiator arrangement in a stepless manner. The control unit may be configured to control the speed of the coolant radiator fan in order to adjust the temperature of the coolant directed to the heat exchanger. In this case, it is possible to control the temperature of the coolant directed to the heat exchanger and thus the heat transfer between the coolant and the oil in the heat exchanger. The coolant radiator arrangement may be arranged in a position in which the coolant is cooled by air of ambient temperature. In this case, it is possible to provide a cooling of the coolant in the coolant radiator arrangement to a temperature close to ambient temperature during operating conditions when the coolant radiator fan is driven with a high speed.

According to an embodiment of the invention, the control unit is configured to control the speed of the coolant radiator fan and the speed of the oil radiator fan such that the oil is cooled to a temperature at which it provides a required cooling of the electric machine with a minimum of energy consumption. The control unit may have access to stored information about combinations of speeds of the oil radiator fan and the coolant radiator fan at which a requested cooling effect of the oil is provided with a minimum of energy consumption for driving of the fans. Alternatively, the control unit may operate the fans with a minimum of noise.

According to an embodiment of the invention, the cooling arrangement comprises a second coolant circuit configured to cool an electric energy storage of the electric power unit. The electric energy storage needs to be cooled to a lower temperature than the power electronics. In view of this fact, the second coolant circuit is designed to direct coolant at a lower temperature to the electric energy storage than to the power electronics in the first coolant circuit.

According to an embodiment of the invention, the cooling arrangement is configured to direct the coolant in the first coolant circuit to a first coolant radiator of the coolant radiator arrangement and to a second coolant radiator of the coolant radiator arrangement, during occasions when ambient air temperature is lower than a specific temperature, and to direct the coolant in the first coolant circuit to the first coolant radiator and the second coolant radiator, and to cool the coolant in the second coolant circuit by means of a refrigeration circuit during occasions when ambient temperature is higher than said specific temperature. The use of two coolant circuits with different coolant temperatures makes it possible to provide an individual cooling of the electric energy storage and the power electronics to required temperatures. During occasions when ambient air temperature is low, it is possible to provide a cooling of the coolant in the first coolant circuit in the first coolant radiator to a temperature at which it provides a required cooling of the power electronics. Furthermore, it is possible to provide a cooling of the coolant in the second coolant circuit in the second coolant radiator to a temperature at which it provides a required cooling electric energy storage. During occasions when ambient air temperature is higher or close to an optimal efficient operating temperature of the electric energy storage, it is not possible to cool the coolant in the second coolant circuit to a temperature at which it provide a required cooling of the electric energy storage. In this case, the coolant in second coolant circuit is cooled by the refrigeration circuit. Thus, the second coolant radiator is not used by the low temperature cooling arrangement at high ambient temperatures. This makes it is possible to cool the coolant in the first coolant circuit in the first coolant radiator and in the second coolant radiator. Consequently, the coolant in the first coolant circuit receives an increased heat transfer area with ambient air which makes it possible to cool the coolant in the first coolant circuit to a lower temperature and provide a more efficiency cooling of the power electronics and the electric machine.

According to an embodiment of the invention, the first coolant circuit is configured to cool the refrigerant in a condenser of the refrigeration circuit. The first coolant circuit may comprise a first parallel line comprising the heat exchanger and a second parallel line comprising the condenser of the refrigerant circuit. A valve member may distribute the coolant flow between the two parallel lines.

The invention also comprises a vehicle comprising a cooling arrangement according to the invention.

BRIEF DESCRIPTION OF THE DRAWINGS

In the following a preferred embodiment of the invention is described, as an example, and with reference to the attached drawings, in which.

DETAILED DESCRIPTION OF A PREFERRED EMBODIMENT OF THE INVENTION

Figure 1:
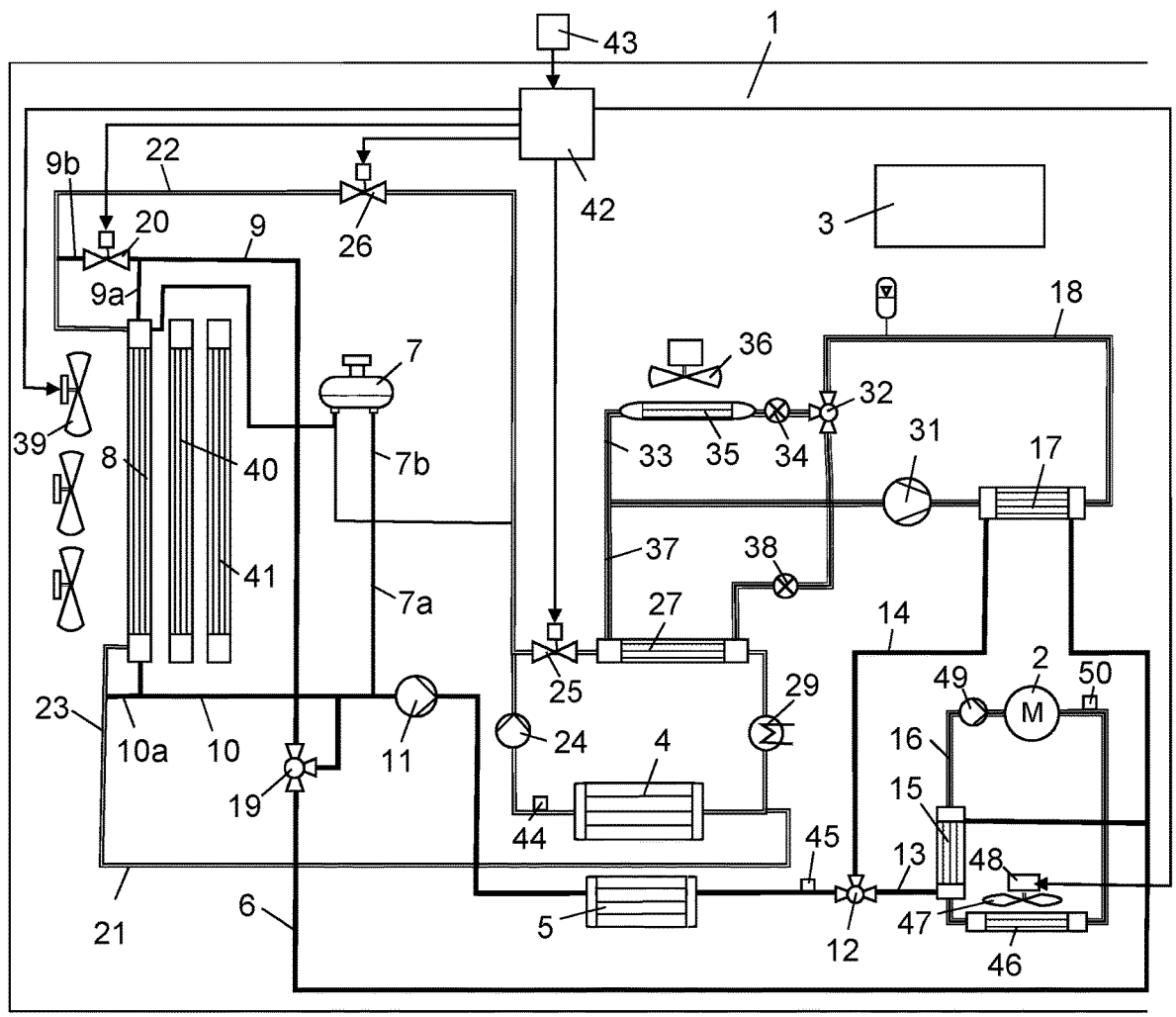
FIG. 1 shows a cooling arrangement according to an embodiment of the invention and FIG. 2 shows the coolant radiator arrangement in FIG. 1 more in detail.

FIG. 1 shows a cooling arrangement for a schematically indicated hybrid vehicle 1. The hybrid vehicle 1 is powered by an electric machine 2 and a schematically indicated combustion engine 3. The electric machine works alternately as motor and generator. The hybrid vehicle 1 comprises an electric power unit in the form of the electric machine 2, an electric energy storage 4 for storing electric energy and power electronics 5 controlling the of flow electric energy between the electric energy storage 4 and the electric machine 2. The electric machine 2, the electric energy storage 4 and the power electronics 5 are heated during operation. Thus, the electric machine 2, the electric energy storage 4 and the power electronics 5 need to be cooled. The electric energy storage 4 has to be cooled to have a lower temperature than the electric machine 2 and the power electronics 5. The electric energy storage 4 may have an optimal efficiency temperature within the temperature range of 20-40° C. The electric machine 2 and the power electronics 5 can usually withstand a temperature up to about 60-70° C. During certain operating conditions such as after a cold start, the temperature of the electric energy storage 4 can be too low. In this case, it is suitable to use the cooling arrangement for heating of the electric energy storage 4.

The cooling arrangement comprises a first coolant circuit 6 with a circulating coolant. The first coolant circuit 6 is connected to an expansion tank 7 via a first deaeration line 7a. The first coolant circuit 6 further comprises a coolant radiator arrangement 8 where the coolant is cooled. The coolant is directed to the coolant radiator arrangement 8 via a coolant radiator inlet line 9 and it leaves the coolant radiator arrangement 8 via a coolant radiator outlet line 10. The coolant radiator outlet line 10 directs the coolant to a first coolant pump 11 which circulates the coolant in the first coolant circuit 6. The first coolant pump 11 directs the coolant to the power electronics 5. A three way valve 12 receives coolant from the power electronics and directs a part of the coolant flow to a first coolant loop 13 or a second coolant loop 14. The coolant loops 13, 14 are arranged in parallel in a part of the first coolant circuit 6. The first coolant loop 13 includes a heat exchanger 15 in which the coolant is in heat transfer contact with oil circulating in an oil circuit 16 for cooling of the electric machine 2. The three way valve 12 directs a remaining part of the coolant flow to the second cooling loop 14 where the coolant cools refrigerant in a condenser 17 of a refrigeration circuit 18. It is possible to direct the entire coolant flow to the second cooling loop 14 in order to bypass the heat exchanger 15. In such a case, the first coolant circuit 6 and the oil circuit 16 are thermally disconnected from each other. The coolant leaving the first coolant loop 13 and the second cooling loop 14 is directed in a common line to a thermostat 19. In case the coolant has a lower temperature than a regulating temperature of the thermostat 19, it is directed back to the first coolant pump 11 without cooling. In case the coolant has a higher temperature than the regulating temperature of the thermostat 19, it is directed, via the coolant radiator inlet 9, to the coolant radiator arrangement 8 for cooling. The coolant radiator inlet line 9 is branched into a first inlet line 9a and a second inlet line 9b. The second inlet line 9b comprises a valve member 20.

The cooling arrangement comprises a second coolant circuit 21 with a circulating coolant. The coolant in the second coolant circuit 21 is also cooled in the coolant radiator arrangement 8. The second coolant circuit 21 is connected to the same expansion tank 7 as the first coolant circuit 6 via a second deaeration line 7b. The coolant enters the coolant radiator arrangement 8 via a coolant radiator inlet line 22 and leaves the coolant radiator arrangement 8 via a coolant radiator outlet line 23. The coolant in the second coolant circuit 21 is circulated by a second coolant pump 24. The second coolant pump 24 sucks coolant from the coolant radiator outlet line 23 and directs it to the electric energy storage 4. The second coolant circuit 21 comprises a valve member 25 controlling the coolant flow to a chiller 27 in the refrigerant system 18 and a valve member 26 controlling the coolant flow to the coolant radiator arrangement 8. In case the valve member 25 is closed and the valve member 26 is open, the coolant leaving the second coolant pump 24 is directed, via the coolant radiator inlet line 9, to the coolant radiator arrangement 8. In case the valve member 25 is open and the valve member 26 is closed, the coolant leaving the second coolant pump 24 is directed to a chiller 27 where the coolant is cooled by refrigerant in the refrigerant system 18. The coolant leaving the chiller 27 enters a heat exchanger 29 where the coolant can be heated by coolant from a cooling arrangement cooling the combustion engine 3. In case, the coolant has a too high temperature it is cooled in the chiller 27. In case, the coolant has a too low temperature it is heated in the heat exchanger 29. As long as the valve member 25 is open and the valve member 26 is closed, the second coolant pump 24 circulates the coolant in a closed loop defined by the electric energy storage 4, the chiller 27 and the heat exchanger 29.

Thus, the cooling arrangement also comprises a refrigeration circuit 18 with a circulating refrigerant. The refrigeration circuit 18 comprises a compressor 31 which circulates and compresses the refrigerant in the refrigeration circuit 18. The refrigerant is directed from the compressor 31 to the condenser 17. The refrigerant is cooled in the condenser 17 to a temperature at which it condenses by coolant in the first coolant circuit 6.

A part of the liquefied refrigerant leaving the condenser 17 is directed to a first cooling loop 33 for cooling a cabin in the vehicle 1. The first cooling loop 33 comprises a first expansion valve 34 where the refrigerant experiences a pressure drop and a significantly lower temperature before it enters an evaporator 35. An electric driven fan 36 is designed to provide an air flow through the evaporator 35 which in a cooled state is directed to the cabin. The refrigerant is heated by the air flow such that it vaporizes. The vaporized refrigerant is directed back to the compressor 31. A remaining part of the liquefied refrigerant is directed to a second cooling loop 37 comprising a second expansion valve 38 where the refrigerant experiences a pressure drop and a significantly lower temperature. Thereafter, the refrigerant enters the chiller 27 where the refrigerant is heated by the coolant in the second coolant circuit 21 to a temperature at which it evaporates. The vaporized refrigerant is directed back to a compressor 31.

A coolant radiator fan arrangement 39 and ram air provide a cooling air flow through the coolant radiator arrangement 8. A charge air cooler 40 is arranged in a position downstream of the coolant radiator fan arrangement 8 with reference to the intended direction of the air flow. A main coolant radiator 41 for cooling of coolant cooling the combustion engine 3 is arranged in a position downstream of the coolant radiator arrangement 8 and the charge air cooler 40 with reference to the intended direction of the air flow. Thus, the coolant is cooled in the first coolant radiator 8a and in the second coolant radiator 8b by air of ambient temperature. A control unit 42 controls the operation of the cooling arrangement by means of information from a temperature sensor 43 about ambient temperature, a temperature sensor 44 about the temperature of the coolant leaving the electric energy storage 4, a temperature sensor 45 about the temperature of the coolant leaving the power electronic 5 and a temperature sensor 50 about the temperature of the oil leaving the electric machine 2.

Thus, the cooling arrangement comprises an oil circuit 16 configured to cool the electric machine 2. The oil circuit 16 comprises an oil radiator 46 in which the oil is cooled by air. A coolant radiator fan 47 forces a cooling air force through the oil radiator 46. The coolant radiator fan 47 forces a cooling air force of ambient temperature through the oil radiator 46. The coolant radiator fan 47 is driven by an electric motor 48. An oil pump 49 circulates oil through the oil circuit 16. The oil circuit 16 also comprises the heat exchanger 15 where heat is transferred between the coolant in the first circuit 6 and the oil in the oil circuit 16.

Figure 2:
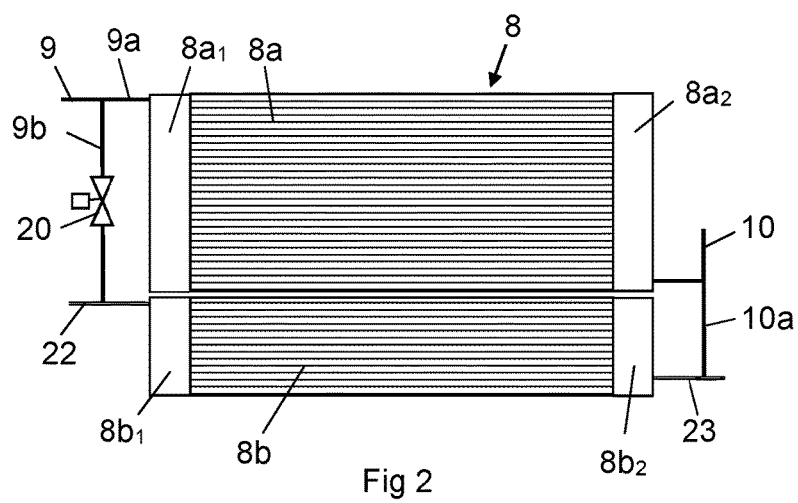

FIG. 2 shows the coolant radiator arrangement 8 more in detail. The coolant radiator arrangement 8 comprises a first coolant radiator 8a and a second coolant radiator 8b. The first coolant radiator 8a and the second coolant radiator 8b are arranged in a common plane at a front portion of the vehicle 1. The first coolant radiator 8a comprises an inlet tube $8a_1$ receiving coolant from the first coolant radiator inlet line 9a in the first coolant circuit 6. The first coolant radiator 8a comprises an outlet tube $8a_2$ connected to the coolant radiator outlet line 10 in the first coolant circuit 6. The second coolant radiator 8b comprises an inlet tube $8b_1$ receiving coolant from the second coolant radiator inlet line 9b in the first coolant circuit 6 or the inlet line 22 of the second coolant circuit 21. The second coolant radiator 8b comprises an outlet tube $8b_2$ connected, via a connection line 10a, to the coolant radiator outlet line 10 in the first coolant circuit 6 or the outlet line 23 in the second coolant circuit 21.

During operation of the hybrid vehicle 1, the control unit 42 receives substantially continuously information from the above mentioned temperature sensors 43, 44, 45, 50 about temperatures related to ambient air, the electric machine 2, the electric energy storage 4 and the power electronics 5. Alternatively, temperature sensors may be used which directly measures the temperatures of said components. The cooling of the coolants in the first coolant radiator 8a and the second coolant radiator 8b is related to the air flow through the coolant radiators 8a, 8b and the ambient air temperature.

In case ambient air temperature is low, the coolants in the first coolant circuit 6 obtains an efficient cooling in the first coolant radiator 8a and the coolants in the second coolant circuit 21 obtains an efficient cooling in the second coolant radiator 8b. In this case, the control unit 42 sets the valve member 20 in a closed position at the same time as it sets the valve member 25 in a closed position and the valve member 26 in an open position. Consequently, the coolant in the first coolant circuit is directed via the first coolant radiator inlet line 9a to the inlet tube $8a_1$ of the first coolant radiator 8a. When the coolant has been cooled in the first coolant radiator 8a, it enters the coolant radiator outlet line 10 in the first coolant circuit 6. The coolant in the second coolant circuit 21 is directed, via the coolant radiator inlet line 22, to the inlet tube $8b_1$ of the second coolant radiator 8b. After that the coolant has been cooled in the second coolant radiator 8b it enters the coolant radiator outlet line 23 in the second coolant circuit 6. Consequently, during operating conditions when the ambient temperature is low, the coolant in the first coolant circuit 6 is cooled in the first coolant radiator 8a and the coolant in the second coolant circuit 21 is cooled in the second coolant radiator 8b.

In case the electric energy storage 4 and/or the power electronics 5 have a too low or a too high temperature, the control unit 42 controls the speed of the coolant radiator fan arrangement 39 in order to increase or decrease the cooling efficiency of the coolant in the first coolant radiator 8a and in the second coolant radiator 8b. When ambient temperature is low, the coolant in the first coolant circuit 6 is usually cooled to a low temperature in the first coolant radiator 8a. The coolant directed from the first coolant radiator 8a to the heat exchanger 15, via the power electronics 5, has usually a temperature low enough to provide a cooling of the oil in the heat exchanger 15 to a temperature at which it provides a required cooling of the electric machine 2. During operating conditions when ambient temperature is low at the same time as ram air flows through the coolant radiator arrangement 8a, 8b with a high speed, it is usually not necessary to start the oil radiator fan 47 and provide an additional cooling of the oil in the oil radiator 46. In case the coolant temperature in the first circuit 6 is very low, it is possible to heat the coolant by means of the oil from the electric machine 2 in the heat exchanger 15. Since the first coolant circuit and the second coolant circuit has a common expansion tank 7, this measure also heats the temperature of the coolant in the second coolant circuit 21.

In case ambient air temperature is high, the coolant obtains a less efficient cooling in the coolant radiator arrangement 8. When ambient temperature is above a specific temperature, it is not possible to provide a cooling of the coolant in the second coolant circuit 21 to a temperature low enough for providing a required cooling of the electric energy storage 4. In this case, the control unit 42 sets the valve member 20 in an open position at the same time as it sets the valve member 25 in an open position and the valve member 26 in a closed position. Due to this measure, a first part of the coolant flow in the first coolant circuit 6 is directed, via the first coolant radiator inlet line 9a, to the first coolant radiator 8a and a second part of the coolant flow in the first coolant circuit 6 is directed, via the open valve member 20 and the second coolant radiator inlet line 9b, to the coolant radiator inlet line 22 and the second coolant radiator 8b. Consequently, during operating condition when ambient air temperature is high, the coolant in the first coolant circuit 6 is cooled in the first coolant radiator 8a and in the second coolant radiator 8b. Since the valve member 25 is open and the valve member 26 is closed, the coolant in the second coolant circuit 21 circulates in a closed loop defined by the second coolant pump 24, the chiller 27, the heating device 29 and the electric energy storage 4. Thus, the coolant in the second coolant circuit 21 is cooled by the refrigerant system in the chiller 27.

The cooling by the refrigerant system ensures a cooling of the coolant to a temperature low enough for maintaining the temperature of the electric energy storage 4 within a range of about 20-40° C. In case the electric energy storage 4 has a too low or a too high temperature during operation, the control unit 42 controls compressor 31 in the refrigeration circuit in order to increase or decrease the cooling efficiency of the coolant in the second coolant circuit 6. At too low temperatures of the coolant, it is possible to activate the heating device 29. In case the electric machine 2 and the power electronics 5 have a too low or a too high temperature, the control unit 42 controls the speed of the coolant radiator fan arrangement 39 and the speed of the oil radiator fan 47. The control unit 42 change the speed of the coolant radiator fan arrangement 39 such that coolant of a desired temperature is directed to the heat exchanger 15. The control unit 42 change the speed of the oil radiator fan 47 such that oil of a desired temperature is directed to the heat exchanger 15. The control unit 42 have access to information about suitable combinations of speeds of the fans 39, 47 at which a required cooling effect is performed with a minimum of energy consumption of the fans 39, 47. The temperatures of the coolant and the oil directed to the heat exchanger 15 are selected in a manner such the coolant leaving the heat exchanger 15 has a suitable temperature for cooling of the power electronics 5 and that the oil leaving the heat exchanger 15 has a suitable temperature for cooling of the electric machine 2.

The arrangement of the coolant radiator arrangement in the front position of a vehicle 1 in contact with ambient air, makes it possible to cool the coolant to a temperature close to ambient temperature. Further, the ram air reduces the energy supply for operation of the fan arrangement 39. At low ambient air temperatures, the use of the coolant radiator arrangement 8 ensures a very effective cooling of the coolant in the first coolant circuits 6 as well as the coolant in the second coolant circuit 21. At high ambient air temperatures, the coolant in the first coolant circuit 6 obtains an increased cooling efficiency since it is cooled in the both coolant radiators 8a, 8b. Thus, it is possible to use the second coolant radiator 8b for cooling of the coolant in the first coolant circuit when the coolant in the low temperature circuit 21 has to be cooled by the refrigerant system 18.

During very high ambient temperatures, when the coolant radiators 8a, 8b are not able to cool the coolant in the first circuit to a temperature low enough to cool the power electronics 5 to a desired temperature, it is possible to increase the speed of oil radiator fan 47 such that it cools the oil in the oil radiator 46 to a lower temperature than the temperature of the coolant in the first cooling circuit 6. In this case, the coolant in the first circuit 6 is cooled in the heat exchanger 15 by the oil.

During operating conditions when the combustion engine is heavily loaded and ambient air has a very high temperature, there is a risk that the charge air is not cooled to a sufficient low temperature in the charge air cooler 40. The control unit 42 may receive information about the temperature of the charge air. In case said information indicates that the charge air has a too high temperature, the control unit 42 closes the valve member 20 such the coolant in the first coolant circuit only is directed to the first coolant radiator 8a. The valve member 25 is open and the valve member 26 is closed since ambient air temperature is high. In this case, there will be no coolant flow and thus no heat transfer in the second coolant radiator 8b and air of ambient temperature is directed to the part of the charge air cooler 40 arranged downstream of the second coolant radiator 8b. This measure provides an increased cooling of the charge air in the charge air cooler 40. In order to further increase the cooling of the charge air in the charge air cooler 40 during such operating conditions, the first coolant radiator 8a can be arranged in a position upstream the coldest part of the charge air cooler 40. A further way to improve the cooling of the charge air in the charge air cooler, is to increase the speed of the oil radiator fan 47.

The invention is in no way confined to the embodiment to which the drawings refer but may be varied freely within the scopes of the claims. It is for example possible to use the cooling arrangement in a pure electric vehicle.

The invention claimed is:

1. A cooling arrangement for an electric machine and at least one further component of an electric power unit, wherein
the cooling arrangement comprises an oil circuit, an oil pump circulating oil from the oil circuit to the electric machine;
a first coolant circuit configured to cool the further component of the electric power unit with a coolant by directing the coolant to the further component of the electric power unit, the further component including power electronics for controlling the flow of electric energy between the electric machine and an electric energy storage:
a second coolant circuit configured to cool an electric energy storage of the electric power unit;
a coolant radiator arrangement in which the coolant in the first coolant circuit and the coolant in the second coolant circuit are cooled by air, the coolant radiator arrangement providing coolant to the first coolant circuit via a first coolant outlet line and providing coolant to the second coolant circuit via a second coolant outlet line,
the oil circuit comprises an oil radiator, an oil radiator fan located and configured to provide an adjustable air flow through the oil radiator; and
a heat exchanger in which heat is transferred between the coolant in the first coolant circuit and the oil in the oil circuit;
wherein the cooling arrangement further comprises a control unit configured to control operation of the cooling arrangement based on information from a first temperature sensor measuring ambient temperature, a second temperature sensor measuring temperature of the coolant leaving the electric energy storage, a third temperature sensor measuring temperature of the coolant leaving the power electronics, and a fourth temperature sensor measuring temperature of the oil leaving the electric machine.

2. A cooling arrangement according to claim 1, wherein the oil radiator is arranged in a position upstream of the heat exchanger and the oil radiator is arranged in a position upstream of the electric machine in the oil circuit.

3. A cooling arrangement according to claim 1, further comprising the cooling arrangement comprises a control unit configured to control the cooling of the oil in the oil radiator.

4. A cooling arrangement according to claim 3, wherein the control unit is configured to control speed of the oil radiator fan.

5. A cooling arrangement according to claim 3 wherein the control unit is configured to control speed of the oil pump.

6. A cooling arrangement according to claim 3, further comprising the cooling arrangement comprises a temperature sensor configured and located for sensing a temperature related to the temperature of the electric machine; and
the control unit is configured to control the cooling of the oil in the oil radiator in view of the temperature of the electric machine.

7. A cooling arrangement according to claim 1, further comprising the oil radiator is arranged in a position at which it is cooled by air of ambient temperature.

8. A cooling arrangement according to claim 1, further comprising the coolant radiator arrangement is arranged in a position in which it is cooled by air of ambient temperature.

9. A cooling arrangement according to claim 1, further comprising the cooling arrangement comprises: a coolant radiator fan configured to provide an air flow through the coolant radiator arrangement; and a control unit configured to control speed of the coolant radiator fan.

10. A cooling arrangement according to claim 9, further comprising the control unit is configured to control the speed of the coolant radiator fan and a speed of the oil radiator fan such that the electric machine provides a required cooling with a minimum energy consumption of the fans.

11. A cooling arrangement according to claim 1, further comprising:

the cooling arrangement is configured to direct the coolant in the first coolant circuit to a first coolant radiator of the coolant radiator arrangement and to direct the coolant in the second coolant circuit to a second coolant radiator of the coolant radiator arrangement during occasions when ambient air temperature is lower than a specific temperature, and to direct the coolant in the first coolant circuit to the first coolant radiator and to the second coolant radiator; and a refrigeration circuit configured to cool the coolant in the second coolant circuit during occasions when ambient air temperature is higher than the specific temperature.

12. A cooling arrangement according to claim 11, further comprising a condenser of the refrigeration circuit in which the first coolant circuit is configured to cool the refrigerant.

13. A cooling arrangement according to claim 1, further comprising a first coolant pump connected in the first coolant circuit and the first coolant pump is configured for pumping the first coolant to the first power electronics and through a radiator configured to cool the coolant from the first power electronic.

14. A cooling arrangement of claim 1, wherein the second coolant circuit bypasses the heat exchanger.

15. A cooling arrangement according to claim 1, further comprising coolant directing means configured for directing the first and second coolant circuits to a common thermostat, the thermostat directing the coolant back to the first coolant pump without cooling the coolant if the coolant has a lower temperature than a selected first temperature, and for directing the coolant past the coolant radiator arrangement for cooling the coolant if the coolant has a higher temperature than the regulating temperature of the thermostat.

16. A cooling arrangement of claim 1, further comprising an electric energy storage which communicates with the second coolant pump to pump coolant to cool the electric energy storage.

17. The cooling arrangement of claim 16, further comprising a second coolant radiator communicating with the second coolant circuit for cooling coolant in the second coolant circuit and a second coolant pump circulating coolant in the second coolant circuit.

18. A vehicle comprising a cooling arrangement for an electric machine and at least one further component of an electric power unit, wherein the cooling arrangement comprises an oil circuit, an oil pump circulating oil from the oil circuit to the electric machine;

a first coolant circuit configured to cool the further component of the electric power unit with a coolant by directing the coolant to the further component of the electric power unit, the further component including power electronics for controlling the flow of electric energy between the electric machine and an electric energy storage:

a second coolant circuit configured to cool an electric energy storage of the electric power unit;

a coolant radiator arrangement in which the coolant in the first coolant circuit and the coolant in the second coolant circuit are cooled by air, the coolant radiator arrangement providing coolant to the first coolant circuit via a first coolant outlet line and providing coolant to the second coolant circuit via a second coolant outlet line, the oil circuit comprises an oil radiator, an oil radiator fan located and configured to provide an adjustable air flow through the oil radiator; and a heat exchanger in which heat is transferred between the coolant in the first coolant circuit and the oil in the oil circuit;

wherein the cooling arrangement further comprises a control unit configured to control speeds of a coolant radiator fan and the oil radiator fan such that the electric machine provides a required cooling with a minimum energy consumption of the fans; and wherein the control unit is further configured to control operation of the cooling arrangement based on information from a first temperature sensor measuring ambient temperature, a second temperature sensor measuring temperature of the coolant leaving the electric energy storage, a third temperature sensor measuring temperature of the coolant leaving the power electronics, and a fourth temperature sensor measuring temperature of the oil leaving the electric machine.

19. A cooling arrangement for an electric machine and at least one further component of an electric power unit, wherein the cooling arrangement comprises an oil circuit, an oil pump circulating oil from the oil circuit to the electric machine;

a first coolant circuit configured to cool the further component of the electric power unit with a coolant by directing the coolant to the further component of the electric power unit, the further component including power electronics for controlling the flow of electric energy between the electric machine and an electric energy storage:

a second coolant circuit configured to cool an electric energy storage of the electric power unit;

a coolant radiator arrangement in which the coolant in the first coolant circuit and the coolant in the second coolant circuit are cooled by air, the coolant radiator arrangement providing coolant to the first coolant circuit via a first coolant outlet line and providing coolant to the second coolant circuit via a second coolant outlet line, the oil circuit comprises an oil radiator, an oil radiator fan located and configured to provide an adjustable air flow through the oil radiator; and a heat exchanger in which heat is transferred between the coolant in the first coolant circuit and the oil in the oil circuit;

wherein the cooling arrangement further comprises a control unit configured to control cooling of the oil in the oil radiator;

wherein the cooling arrangement comprises a coolant radiator fan configured to provide an air flow through the coolant radiator arrangement;

wherein the control unit is further configured to control speeds of the coolant radiator fan and the oil radiator fan such that the electric machine provides a required cooling with a minimum energy consumption of the fans; and wherein the control unit is further configured to control operation of the cooling arrangement based on information from a first temperature sensor measuring ambient temperature, a second temperature sensor measuring temperature of the coolant leaving the electric energy storage, a third temperature sensor measuring temperature of the coolant leaving the power electronics, and a fourth temperature sensor measuring temperature of the oil leaving the electric machine.

\* \* \* \* \*